United States Patent
Calder et al.

(10) Patent No.: US 10,578,055 B2
(45) Date of Patent: Mar. 3, 2020

(54) TURBINE ENGINE THRUST REVERSER STOP

(71) Applicant: MRA Systems, LLC., Baltimore, MD (US)

(72) Inventors: David Patrick Calder, Baltimore, MD (US); Keith E J Blodgett, Milford, OH (US); Graham Frank Howarth, Middletown, DE (US); Andrew Michael Roach, Aberdeen, MD (US)

(73) Assignee: MRA Systems, LLC, Norwalk, CT (US)

( * ) Notice: Subject to any disclaimer, the term of this patent is extended or adjusted under 35 U.S.C. 154(b) by 324 days.

(21) Appl. No.: 15/674,164

(22) Filed: Aug. 10, 2017

(65) Prior Publication Data

US 2019/0048824 A1 Feb. 14, 2019

(51) Int. Cl.
| | |
|---|---|
| *F02K 1/72* | (2006.01) |
| *F02K 1/62* | (2006.01) |
| *F01L 9/02* | (2006.01) |
| *F01D 25/24* | (2006.01) |
| *F02C 3/04* | (2006.01) |
| *F02K 1/76* | (2006.01) |

(52) U.S. Cl.
CPC .............. *F02K 1/625* (2013.01); *F01D 25/24* (2013.01); *F01L 9/023* (2013.01); *F02C 3/04* (2013.01); *F02K 1/72* (2013.01); *F02K 1/763* (2013.01); *F05D 2260/30* (2013.01)

(58) Field of Classification Search
CPC ... F02K 1/72; F02K 1/625; F02K 1/70; F02K 1/62; F02K 1/766; F02K 1/80; F02K 1/805
See application file for complete search history.

(56) References Cited

U.S. PATENT DOCUMENTS

| | | | |
|---|---|---|---|
| 3,475,913 A | 11/1969 | Mortlock et al. | |
| 4,026,105 A | 5/1977 | James | |
| 5,255,510 A | 10/1993 | Lardellier | |
| 2010/0132332 A1* | 6/2010 | Vauchel | F02K 1/72 60/226.2 |
| 2010/0158684 A1* | 6/2010 | Baralon | F01D 5/146 415/208.1 |

FOREIGN PATENT DOCUMENTS

| | | |
|---|---|---|
| EP | 2562405 A1 | 2/2013 |
| FR | 2358555 A1 | 2/1978 |
| JP | 3600452 A | 3/2000 |
| WO | 2015028735 A1 | 3/2015 |
| WO | 2017044081 A1 | 3/2017 |

OTHER PUBLICATIONS

Japanese Patent Office, Japanese Office Action re Application No. 2018-147312, Oct. 1, 2019, 3 pages, Japan.

* cited by examiner

*Primary Examiner* — Andrew H Nguyen
(74) *Attorney, Agent, or Firm* — McGarry Bair PC

(57) ABSTRACT

A thrust reverser assembly for a turbine engine can include a core engine surrounded by a nacelle. A bypass duct can be formed in the space between the core engine and the nacelle. A blocker door can be movable to a deployed position extending into the bypass duct. A stop can be provided on the core engine to abut and support force applied to the deployed blocker door. The stop can have an airfoil shape.

17 Claims, 9 Drawing Sheets

TURBINE ENGINE THRUST REVERSER STOP

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Thrust reverser assemblies are used within turbine engines to provide a reverse thrust, for example, for deceleration. Reverse thrust is typically achieved by deploying a door assembly into a bypass duct, which diverts air from an aft direction to forward direction. The door assembly is deployed with an actuation assembly by moving a translating cowl to release and/or drive the door into the bypass duct. Thus, the blocker door and thrust reverser assembly are subject to a high pressure airflow moving through the bypass duct, which requires a stronger, and often heavier, actuation system having a higher power to control the rate of deployment and support the high pressure airflow against the door without damaging the thrust reverser or actuation assemblies.

In order to accommodate the high pressure airflow against the blocker door during deployment, a larger actuation system is required to prevent damage. The larger actuation system consumes additional space in the engine and adds weight to the system. Thus, there is a need for a blocker door implementation, which uses a smaller actuation system and reduces weight added to the engine.

BRIEF DESCRIPTION OF THE INVENTION

In one aspect, the disclosure relates to a turbine engine including a core engine defining an engine centerline and a nacelle surrounding at least a portion of the core engine and including a nacelle interior. A bypass duct is defined by and between the nacelle and the core engine. A blocker door couples to the nacelle and is movable between a stowed position where the blocker door is positioned in the nacelle interior, and a deployed position where the blocker door extends into the bypass duct to deflect air from the bypass duct. A stop having an airfoil shape includes a leading edge and a trailing edge, and is located on the core engine where the blocker door abuts the stop in the deployed position. The stop further comprises one of: a curved stop centerline extending between the leading edge and the trailing edge to define a cambered airfoil shape, an aperture extending through the stop, or an actuator operable to extend the stop into the bypass duct when the blocker door is in the deployed position.

In another aspect, the disclosure relates to a thrust reverser assembly for a turbine engine including a core engine and a nacelle surrounding at least a portion of the core engine to define a bypass duct between the nacelle and the core engine. The thrust reverser assembly includes a cascade element and a blocker door movable between a stowed position, where the blocker door closes the cascade element, and a deployed position where the blocker door opens the cascade element. A blocker door actuator mechanically couples to the blocker door selectively moving the blocker door between the stowed and deployed positions. A stop is positioned to abut the blocker door in the deployed position, and further comprises on of: an airfoil shape including a curved stop centerline extending between a leading edge and a trailing edge to define a cambered airfoil shape, an aperture extending through the stop, or an actuator operable to extend the stop to abut the blocker door when the blocker door is in the deployed position.

In yet another aspect, the disclosure relates to a stop for a deployable hidden blocker door for a turbine engine comprising an airfoil shape defining a stop centerline extending between a leading edge and a trailing edge, and positioned to abut the hidden blocker door in a deployed position to share aerodynamic loading on the deployed hidden blocker door. The stop further comprises one of: a curved stop centerline extending between the leading edge and the trailing edge to define a cambered airfoil shape, an aperture extending through the stop, or an actuator operable to extend the stop to abut the hidden blocker door when the hidden blocker door is in the deployed position.

DETAILED DESCRIPTION OF THE INVENTION

Figure 1:
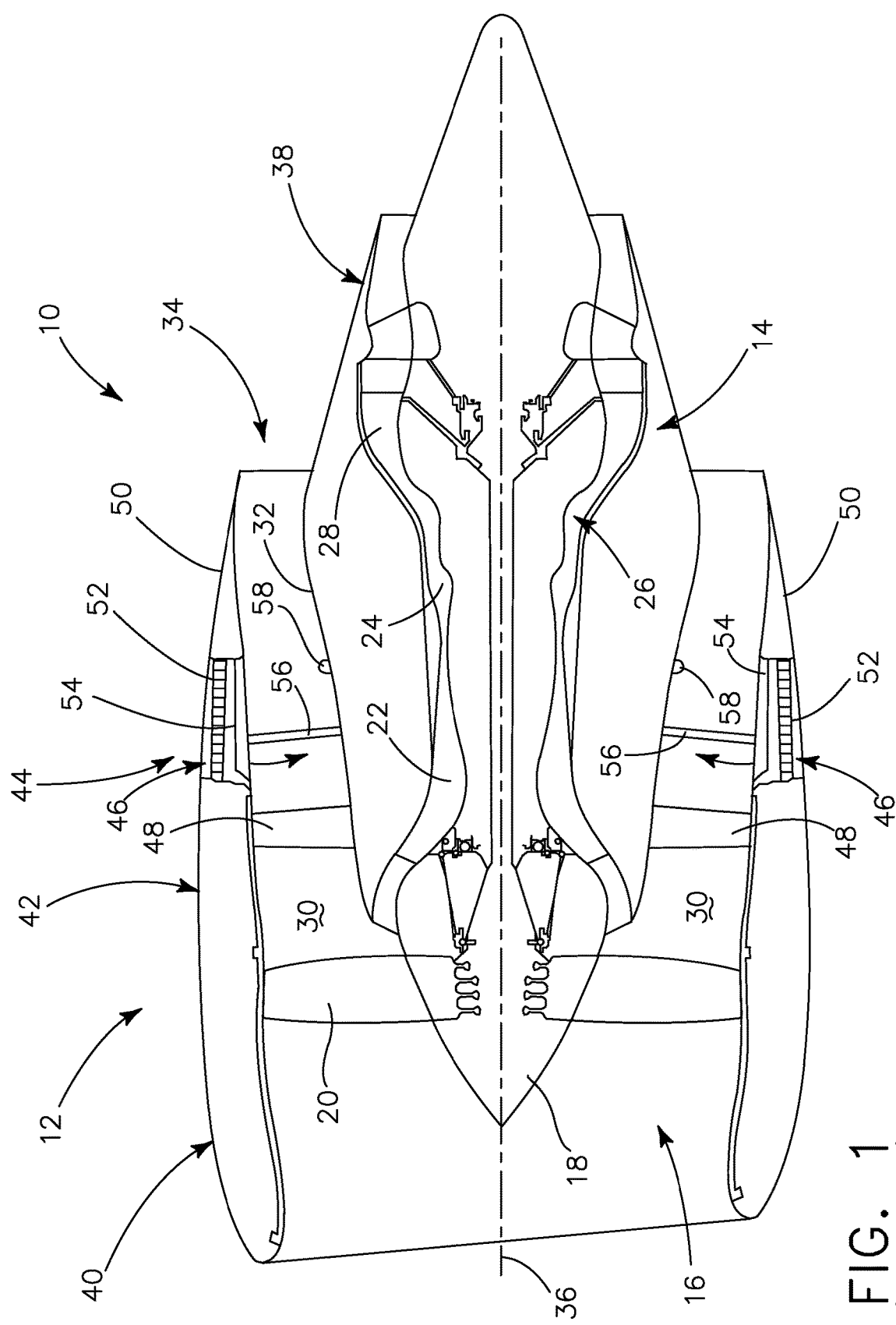
FIG. 1 is a prior art schematic cross-sectional diagram of a gas turbine engine for an aircraft including a thrust reverser assembly with a stop according to an aspect of the invention.

The described aspects of the present invention are directed to a thrust reverser assembly, particularly in a gas turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

It should be further understood that "a set" can include any number of the respectively described elements, including only one element.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 schematically represents a gas turbine engine illustrating a thrust reverser assembly shown as a high-bypass turbofan engine 10 of a type known in the art. The engine 10 is schematically represented as including a nacelle 12 and a core engine 14. A nacelle interior 46 can be defined by the nacelle 12. The engine 10 has a generally longitudinal extending axis or centerline 36 extending forward to aft. A fan assembly 16 located in front of the core engine 14 includes a spinner nose 18 projecting forwardly from an array of fan blades 20. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate additional engine thrust. The bypassed air passes through an annular-shaped bypass duct 30 between the nacelle 12 and an inner core cowl 32, and exits the bypass duct 30 through a fan exit nozzle 34. The inner core cowl 32 defines the radially inward boundary of the bypass duct 30, and provides a 32 transition surface to a primary exhaust nozzle 38 that extends aft from the core engine 14. The nacelle 12 defines the radially outward boundary of the bypass duct 30. The bypassed fan air flows through bypass duct 30 defined by the nacelle 12 and inner core cowl 32 before being exhausted through the fan exit nozzle 34. One or more outlet guide vanes 48 can be provided within the bypass duct 30 downstream of the fan blades 20. The outlet guide vanes 48 can induce a helical, circumferential component on a flow of fluid driven by the fan, or can turn a circumferential flow to an axial flow.

The nacelle 12 is typically composed of three primary elements that define the external boundaries of the nacelle 12: an inlet assembly 40, a fan cowl 42 interfacing with an engine fan case that surrounds the fan blades 20, and a thrust reverser assembly 44 located aft of the fan cowl 42. The thrust reverser assembly 44 includes three primary components: a translating cowl 50 mounted to the nacelle 12, a cascade 52 schematically represented within the nacelle interior 46, and blocker doors 54 adapted to be pivotally deployed from stowed positions within the nacelle interior 46 shown in FIG. 1 as radially inward from the cascade 52. The inner core cowl 32 of the core engine 14 is also part of the thrust reverser assembly 44, and the fore end of the blocker door 54 is pivoted into engagement or close proximity with the inner core cowl 32 when the blocker door 54 is fully deployed. The inner core cowl 32 can be disposed with a set of stops 58 protruding into the bypass duct 30. The cascade 52 is a fixed structure of the nacelle 12, whereas the translating cowl 50 is adapted to be translated aft to expose the cascade 52 and deploy the blocker door 54 into the bypass duct 30, causing bypassed air within the bypass duct 30 to be diverted through the exposed cascade 52 and thereby provide a thrust reversal effect. While two blocker doors 54 are shown in FIG. 1, a set of blocker doors 54 are typically circumferentially spaced around the nacelle 12.

Figure 2:
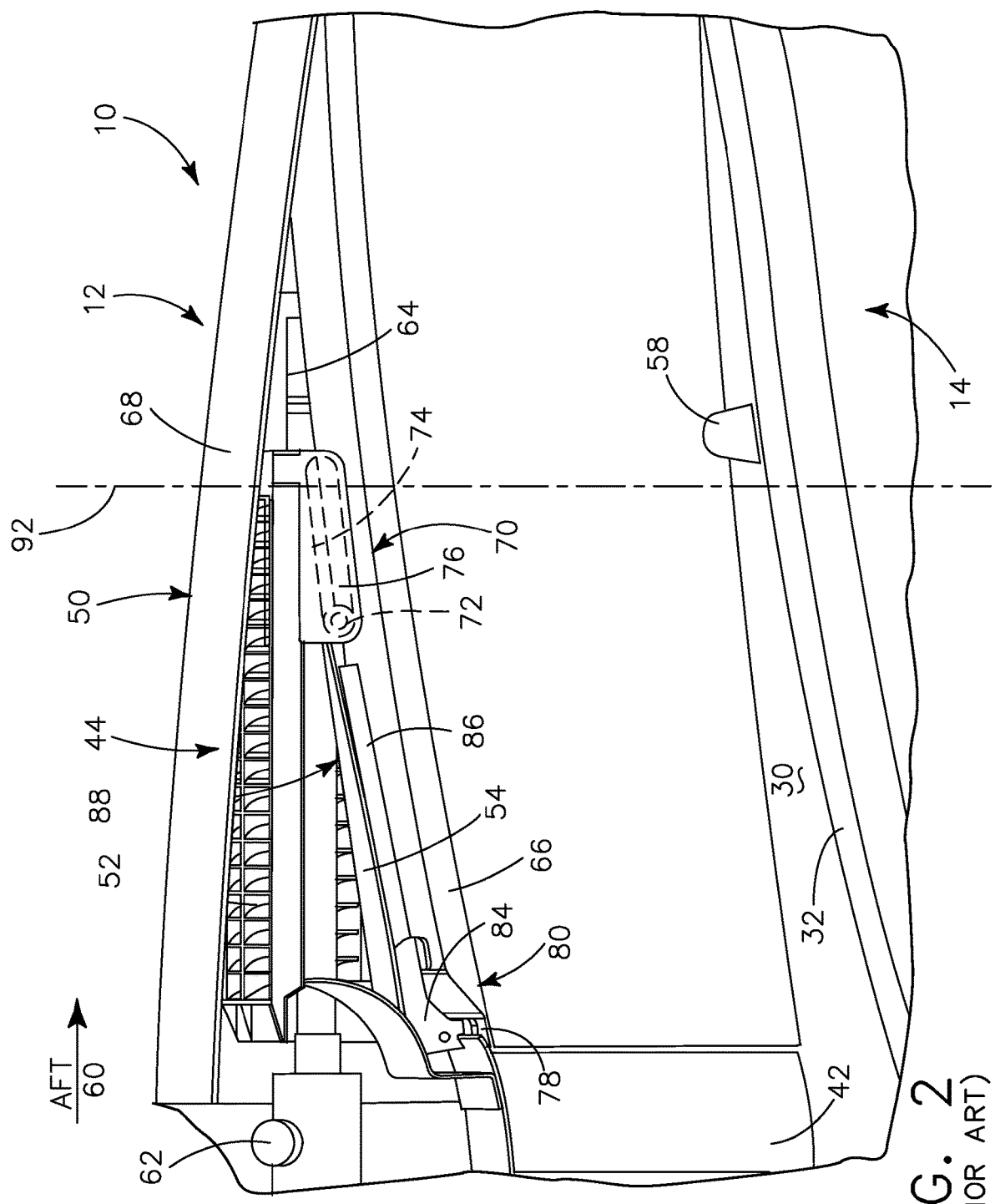
FIG. 2 is a prior art isolated sectional view of the thrust reverser assembly of FIG. 1 in the stowed position.
Figure 3:
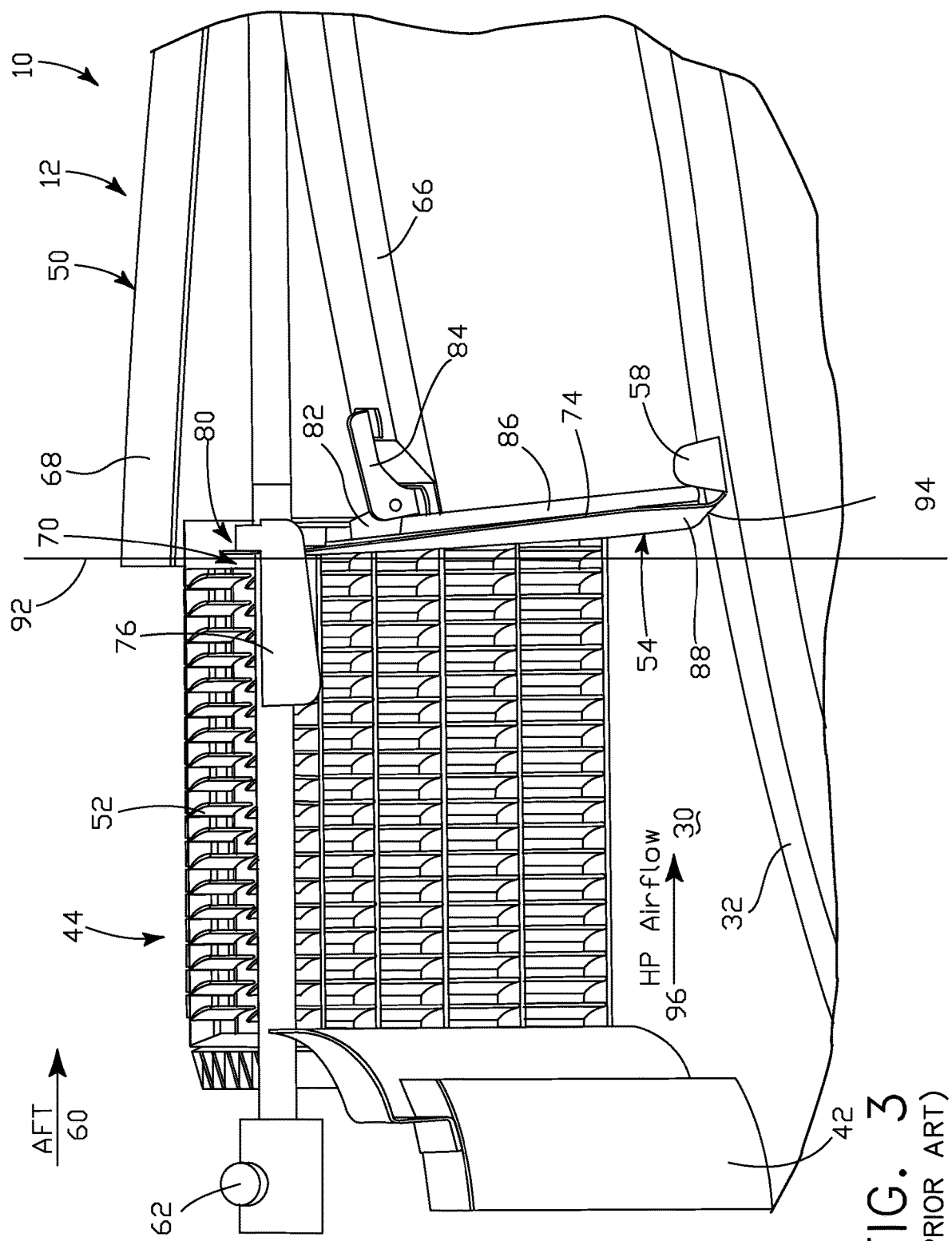
FIG. 3 is a prior art isolated sectional view of the thrust reverser assembly of FIG. 1 in the deployed position.

FIGS. 2 and 3 show close-up view of the thrust reverser assembly 44 in the stowed and deployed positions, respectively, as is known in the art. The blocker door 54 is adapted to deploy from a stowed position, shown in FIG. 2 as radially inward of the cascade 52, to a fully deployed position shown in FIG. 3. Whereas the cascade 52 is an element of the fixed structure of the nacelle 12, meaning that the cascade 52 does not move during the operation of the thrust reverser assembly 44, the translating cowl 50 is adapted to be translated in the aft direction 60 of the engine 10 to expose the cascade 52 and deploy the blocker door 54 into the bypass duct 30. An actuator 62 is mounted within the nacelle 12. The actuator 62 can be of any suitable type known in the industry.

Translation of the translating cowl 50 in the aft direction 60 by the actuator 62 causes the blocker door 54 to be deployed into the bypass duct 30, abutting the stop 58, as shown in FIG. 3. From FIG. 3, it can be appreciated that, when fully deployed, the blocker door 54 extends across the entire radial width of the bypass duct 30 and causes bypassed air within the bypass duct 30 to be diverted through the exposed cascade 52 and thereby provide a thrust reversal effect. Prior to translation of the translating cowl 50 (e.g., while the thrust reverser assembly 44 is not in use), the stowed blocker door 54 is positioned radially inward of the cascade 52, and both the cascade 52 and blocker door 54 are completely concealed by the translating cowl 50. More particularly, the cascade 52 and blocker door 54 are contained within a cavity 64 defined between radially inner and outer walls 66 and 68 of the translating cowl 50, such that the radially inner wall 66 of the translating cowl 50 completely separates the cascade 52 and blocker door 54 from the bypass duct 30. As such, the inner wall 66 of the translating cowl 50 defines a portion of the radially outer flow surface of the bypass duct 30. As such, the blocker door 54 does not define any portion of the radially outer flow surface of the bypass duct 30 during normal engine operation, and therefore does not create surface interruptions (gaps and steps) or cause duct leakage. Furthermore, the blocker door 54 is not exposed to damage and wear-inducing conditions during normal in-flight engine operations. Another advantage is that the entire inner wall 66 of the translating cowl 50 can incorporate an uninterrupted acoustic treatment (not shown) of its entire surface area to promote increased engine noise attenuation.

In the deployed position, best seen in FIG. 3, the stop 58 can mount to the inner core cowl 32 or can be structurally integral with the inner core cowl 32, extending into the bypass duct 30 radially from the centerline 36. The stop 58 is disposed on the inner core cowl 32 aft of a roller and guide track assembly 70, such that a radial axis 92, being normal to the centerline 36 and passing through the aft end of the roller and guide track assembly 70, is forward of the stop 58.

The stop 58, can be a cylinder shape with a rounded top, however any geometry is contemplated. Exemplary geometries can include a geometry, which minimizes aerodynamic drag within the bypass duct 30 or provides an optimal surface on which the blocker door 54 abuts the stop 58 in the deployed position, such as a seat defined in the stop 58 on which an end 94 of the blocker door 54 can rest. One further exemplary geometry can include an airfoil shape. Additionally, it is contemplated that multiple stops 58 can be used with a single blocker door 54 or an elongated, annular stop, disposed partially or wholly around the inner core cowl 32, for example, can be used with multiple blocker doors 54. It should be understood that the stop 58 can be constructed of various materials, including metallic, plastic, rubber, and composite materials commonly used in aerospace applications or any other material adapted for the shock or wear associated with bearing dynamic loads, relative motion, or pre-load capabilities. The stop can also be fabricated by machining, casting, molding, lamination, etc., and combinations thereof. The stop 58 can be mechanically attached or formed integral to the inner core cowl bondment design.

The blocker door 54 is shown as being coupled to the fixed structure of the nacelle 12, the cascade 52, as well as coupled to the translating cowl 50, and the inner wall 66. Two degrees of freedom are allowed on the aft end of the blocker door 54 allowing the blocker door 54 to rotate and move in the fore and aft directions relative to the cascade 52. The connection between the blocker door 54 and inner wall 66 of the translating cowl 50 is shown as a rotating connection, which supports a slider (not shown) mounted to a track assembly 70 on the rear side of the blocker door 54. As the translating cowl 50 deploys aft, the rotating pivot 84 travels along the blocker door guide track 76 and guides the blocker door 54 into the bypass fan duct 30. As the translating cowl 50 translates aft, the cascades 52 are exposed. The blocker door 54 re-diverts bypass airflow through the cascade 52 in the forward direction, providing reverse thrust.

The rotating and sliding joints of the blocker door 54 are preferably geometrically and physically designed to provide a desired sequence and rate of deployment for the blocker doors 54. In the deployed position, multiple blocker doors 54 can be configured to interface together to yield a desired percentage of duct blockage, which can be further optimized by seals provided along the edges of the blocker doors 54.

In FIG. 3, the translating cowl 50 has been translated in the aft direction 60, being pushed by the actuator 62, such that the cascade 52 is exposed and the blocker door 54 is deployed. In the deployed position, the blocker door 54 abuts the stop 58 on the trailing end 74 of the blocker door 54. The blocker door 54, pivoting at a pivoting assembly 80, extends beyond the radial axis 92 such that the longitudinal orientation of the blocker door 54 now defines an obtuse angle relative to the cascade 52.

In the deployed position, the blocker door 54 abuts the stop 58 and a high pressure (HP) airflow 96 moves through the bypass duct 30 in an aft direction. The HP airflow 96 presses against the blocker door 54 with a force, creating a load determined by the airflow pressure and the surface area of the blocker door 54. The load can be at least partially borne by the stop 58, whereas the load would normally be transferred to the translating cowl bondment and then to the actuator 62 coupled to the blocker door 54. Additionally, the load can then be shared by the inner core cowl 32 and the core engine 14, better adapted to bear the load. Thus, the load created by the force of the high pressure airflow 96 on the actuator 62 is reduced in relation to the load borne by the stop 58.

Figure 4:
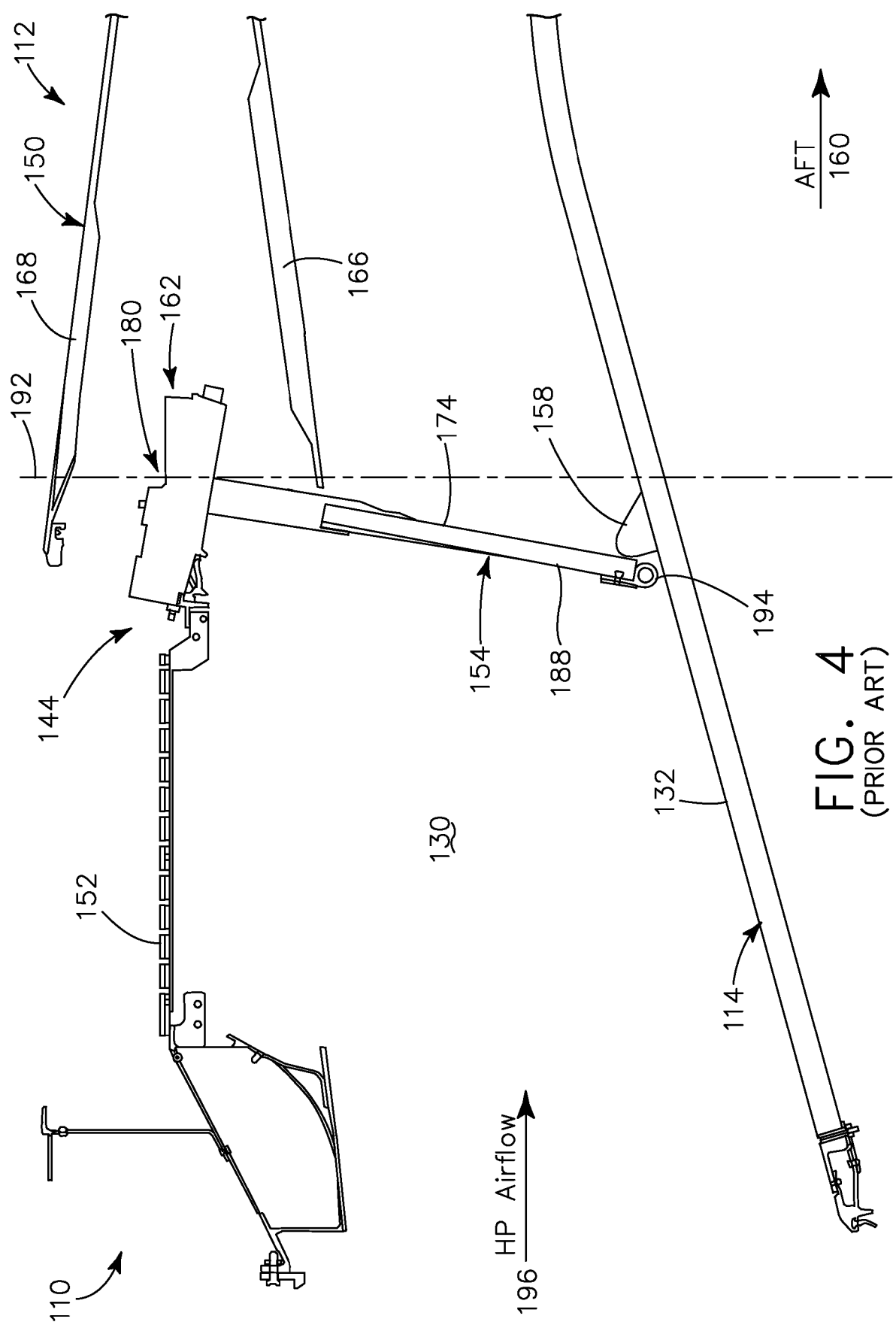
FIG. 4 is a prior art isolated sectional view of a thrust reverser assembly including a stop according to another aspect of the invention.
Figure 5:
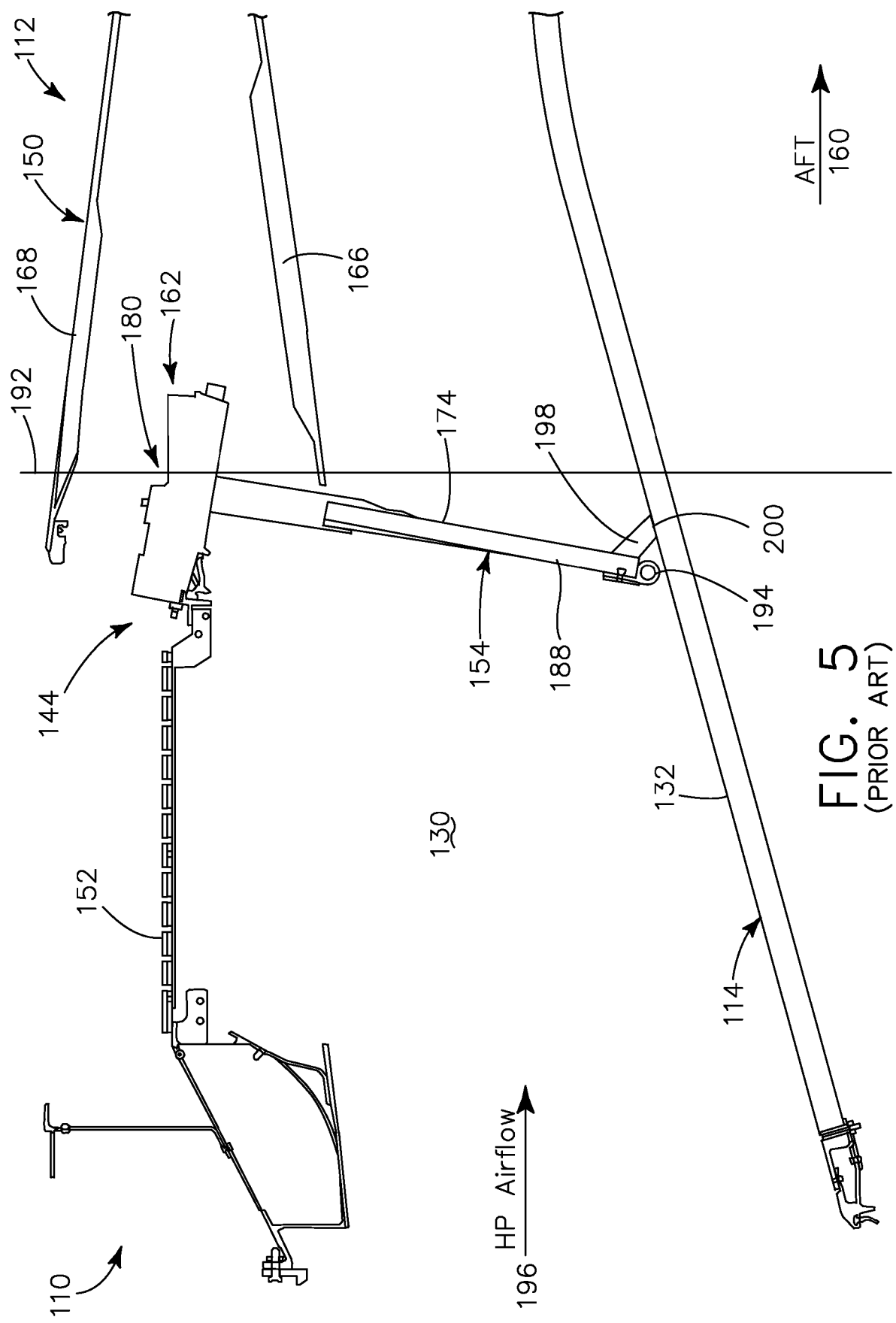
FIG. 5 is a prior art isolated sectional view of the thrust reverser assembly of FIG. 4 with the stop mounted to a blocker door.

Turning now to FIGS. 4 and 5, a thrust reverser assembly is shown as is known in the art. Elements of the second aspect are similar to the elements first aspect and numerals increased by 100 will be used to identify the similar elements. In FIG. 4, an engine 110 includes a nacelle 112 and a core engine 114 with a high-pressure turbine. A bypass duct 130 is defined between the nacelle 112 and an inner core cowl 132 enclosing the high-pressure turbine 126. The nacelle 112 further includes a thrust reverser assembly 144 substantially within the nacelle 112.

A translating cowl 150, further defining the nacelle 112, is shown translated in the aft direction 160. The translating cowl 150 further includes an inner wall 166 and an outer wall 168, being relative to the radial center of the engine 110. The translating cowl 150, prior to translation in the aft direction 160, encloses the thrust reverser assembly 144. The thrust reverser assembly 144 includes a cascade 152, a blocker door 154, and an actuator system 162 coupled to a pivoting assembly 180. A stop 158 mounted to the inner core cowl 132 is also a part of the thrust reverser assembly 144, adapted to receive the deployed blocker door 154. The blocker door 154 further includes a leading end 188 for receiving a high-pressure (HP) airflow 196 and a trailing end 174 opposite of the leading end 188. The blocker door 154 additionally includes a longitudinal end 194 extending opposite of the pivoting assembly 180.

During deployment of the thrust reverser assembly 144, the translating cowl 150 is translated in the aft direction 160 deploying the blocker door 154 into the position shown in FIG. 4. A radial axis 192 extends radially through the pivoting assembly 180, being normal to the engine centerline. The stop 158 is mounted on the inner core cowl 132 forward of the radial axis 192. In the deployed position, the blocker door 154 abuts the stop 158 such the blocker door 154 defines an acute angle relative to the cascade 152. With the blocker door 154 disposed forward of the radial axis 192, a greater amount of airflow can be diverted through the cascade 152, increasing the rate of thrust reversal and the efficiency of the thrust reverser assembly 144. Additionally, an increased load from the HP airflow 196 can push against the blocker door 154 as the stop 158 and the inner core cowl 132 bear a significant portion of the load translated from the blocker door 154. Thus, an increased load can be borne by the thrust reverser assembly 144 and increase the effectiveness of the thrust reverser assembly 144. Alternatively, a smaller load is borne by the actuation system 162, providing for a smaller, lighter actuation system 162 without sacrificing initial effectiveness of the thrust reverser assembly.

Turning to FIG. 5, the thrust reverser assembly 144 is shown with an alternate stop 198 mounted to the blocker door 154 in accordance with the second aspect of the invention. The stop 198 can mount to the blocker door 154 or can be integrally constructed with the blocker door 154, such that the stop 198 is hidden within the translating cowl 150 when the thrust reverser assembly 144 is in the stowed position, eliminating any aerodynamic drag that can occur when the stop is mounted on the inner core cowl 32. The stop 198 mounts to the trailing end 174 of the blocker door 154, near the longitudinal end 194, and can be shaped with a seat 200 such that a surface area of the seat 200 abuts the inner core cowl 132. The seat 200 allows a greater load translation through the stop 198 to the inner core cowl 132.

When deployed, the stop 198 abuts the inner core cowl 132 such that the blocker door 154 cannot extend beyond the radial axis 192, typically defining an acute angle relative to the engine centerline 36. In an alternative aspect, the stop 198 can be disposed on the longitudinal end 194 of the blocker door 154, or the leading end 188. Additionally, the stop 198 can interface with a sub-flush feature on the inner core cowl 132.

During deployment, the stop 198, as well as the inner core cowl 132, bears the load created by the HP airflow 196 against the blocker door 154, reducing the load translated to the actuation system 162. The load borne by the blocker door 154 is translated through the stop 198 to the inner core cowl 132, permitting the use of a smaller actuation system 162.

It should be understood that it is contemplated that any stop as described herein can optionally be attached to the blocker door 154 adapted to abut the inner core cowl 132 in the deployed position, as opposed to being fixed on the inner core cowl 132.

Figure 6:
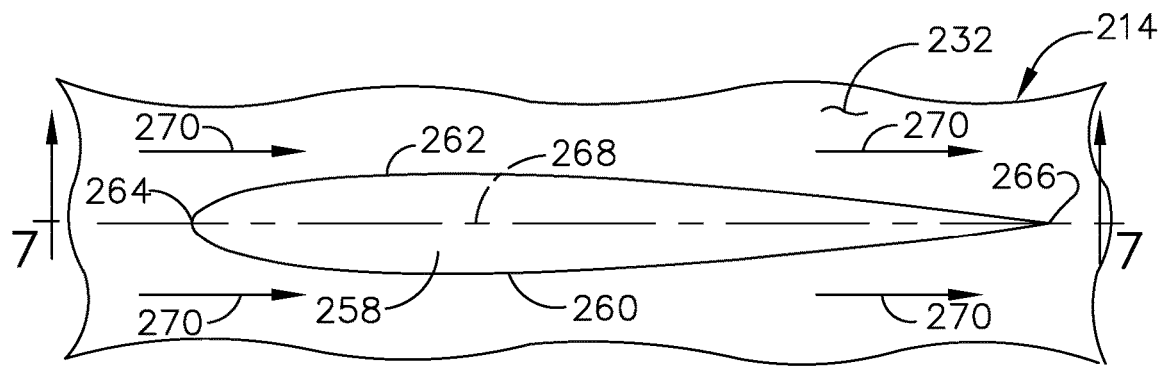
FIG. 6 is a top view of a stop having a symmetric airfoil shape.

Referring now to FIG. 6, an alternative stop 258 can be positioned on a portion of an inner core cowl 232 of a core engine 214. The stop 258 can have an airfoil shape, having a first convex sidewall 260 and a second convex sidewall 262, defining a leading edge 264 and a trailing edge 266. While only one stop 258 is shown, it is contemplated that there can be any number of stops 258 positioned around the core engine 214.

The stop 258 can have an airfoil shape, defining a linear stop centerline 268 extending between the leading edge 264 and the trailing edge 266. The stop centerline 268 can be defined along the stop 258 equidistant from the first and second convex sidewall 260, 262. The stop centerline 268 is linear to define a symmetrical airfoil shape. While illustrated as a symmetrical airfoil shape, it is contemplated that the airfoil can be asymmetrical, having a curved stop centerline. In one example, the stop 258 can be positioned to align the stop centerline 268 parallel to an engine centerline, such as the engine centerline 36 of FIG. 1. Alternatively, the stop 258 can be positioned to orient the stop centerline 268 parallel to a local flow of fluid 270 passing along the stop 258. The local flow of fluid 270 can be a laminar airflow passing along the core engine 214.

Alternatively, it is contemplated that the local flow of fluid 270 can have a circumferential component in addition to an axial component, defining a circumferential flow about the core engine 214 extending aft. In one non-limiting example, such an airflow can be helical. In such an arrangement, the stop 258 can be arranged to align the stop centerline 268 with the local flow of fluid 270, while being offset from radially parallel to the engine centerline.

Figure 7:
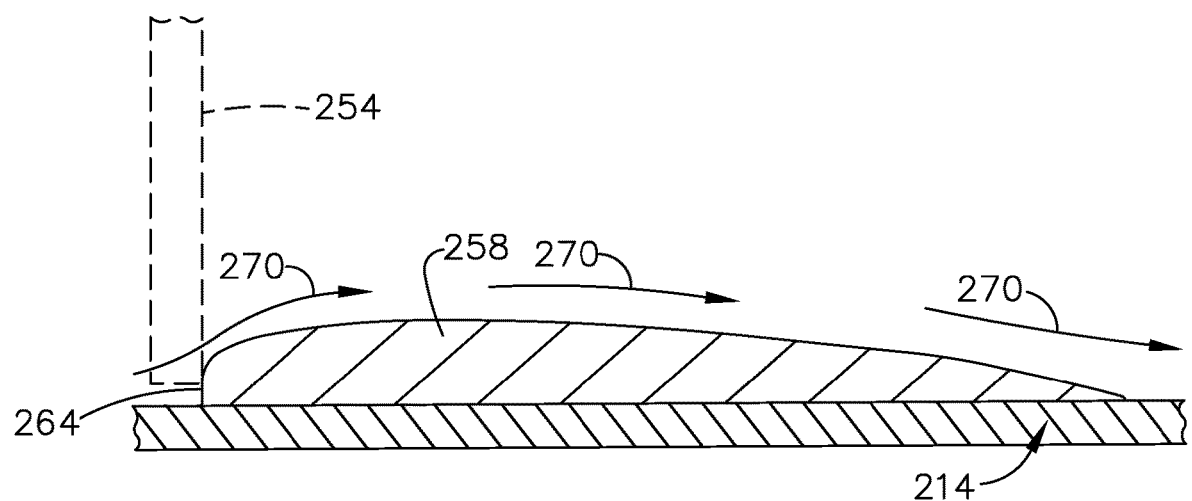
FIG. 7 is a cross-sectional view of the stop of FIG. 6 taken across section 7-7 with a blocker door abutting the stop.

Referring now to FIG. 7, illustrating a side view of the top-down view of FIG. 6, a blocker door 254 can optionally be in a deployed position abutting the stop 258 at the leading edge 264. When the blocker door 254 is not in the deployed position, the local flow of fluid 270 can pass along and over the stop 258. It should be understood that while the airfoil-shaped stop 258 is shown as an elongated airfoil, the stop 258 can include any suitable length, or any suitable geometry as is desirable. The airfoil-shaped stop 258 can also be truncated and have a blunt trailing edge.

The stop 258 having the symmetrical airfoil shape, can provide for reduced drag caused by the stop 258 when the blocker door 254 is not in the deployed position; such as in a stowed position as shown in FIG. 1. Furthermore, the symmetrical airfoil shape for the stop 258 can provide for decreased airflow swirl generated by the stop 258, which can improve local boundary layer attachment for the local flow of fluid 270 passing over the stop 258 and along the core engine 214. Decreasing the drag and swirl generated by the stop 258 can provide for improved specific fuel consumption for the engine, while providing for reduced weight of an overall thrust reverser assembly by sharing aerodynamic loading of the blocker door 254 with the stop 258 in the deployed position.

Figure 8:
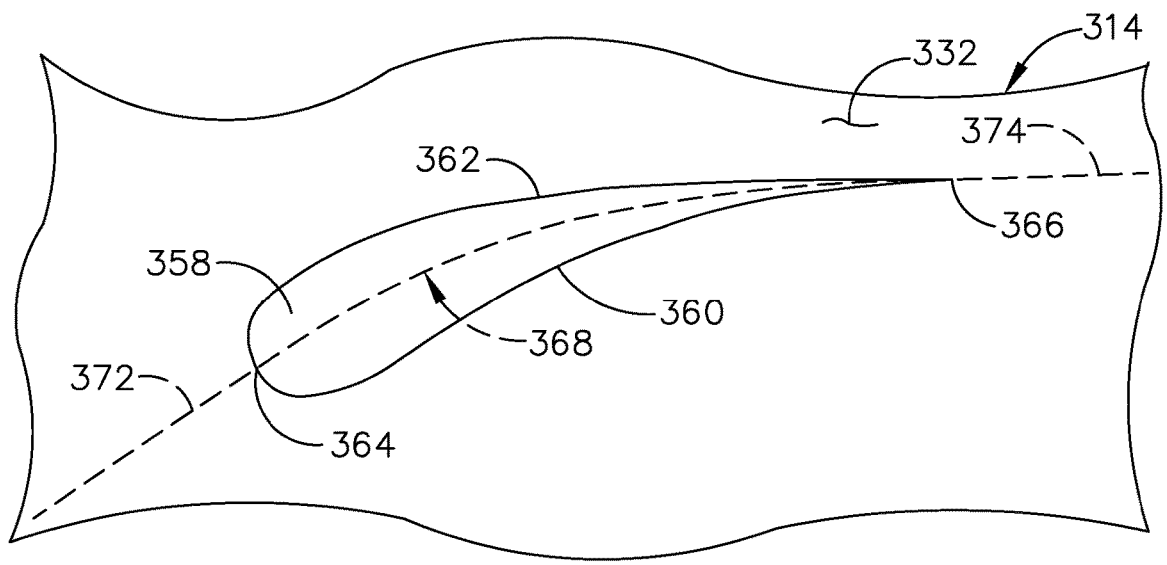
FIG. 8 is a top view of a stop having a cambered airfoil shape.

Referring now to FIG. 8, a stop 358 can have a curved airfoil shape, or a cambered airfoil shape, having a concave sidewall 360 and a convex sidewall 362 extending between a leading edge 364 and a trailing edge 366. The airfoil-shaped stop 358 can be asymmetric. The stop 358 can be positioned along an inner core cowl 332 of a core engine 314, such as along the exterior of the inner core cowl 32 of the core engine 14 of FIG. 1. While only one stop 358 is shown, any number of stops 358 is contemplated.

The cambered airfoil shape for the stop 358 can define a curved stop centerline 368 extending equidistant between the concave sidewall 360 and the convex sidewall 362 from the leading edge 364 to the trailing edge 366. The cambered airfoil shape for the stop 358 defines a curvature for the stop centerline 368. Such a curvature can define a leading edge axis 372 parallel to the stop centerline 368 at the leading edge 364, and a trailing edge axis 374 parallel to the stop centerline 368 at the trailing edge 366. The leading edge axis 372 and the trailing edge axis 374 can be angularly offset from one another, as defined by the curvature of the stop centerline 368 and the curved, cambered airfoil shape.

Figure 9:
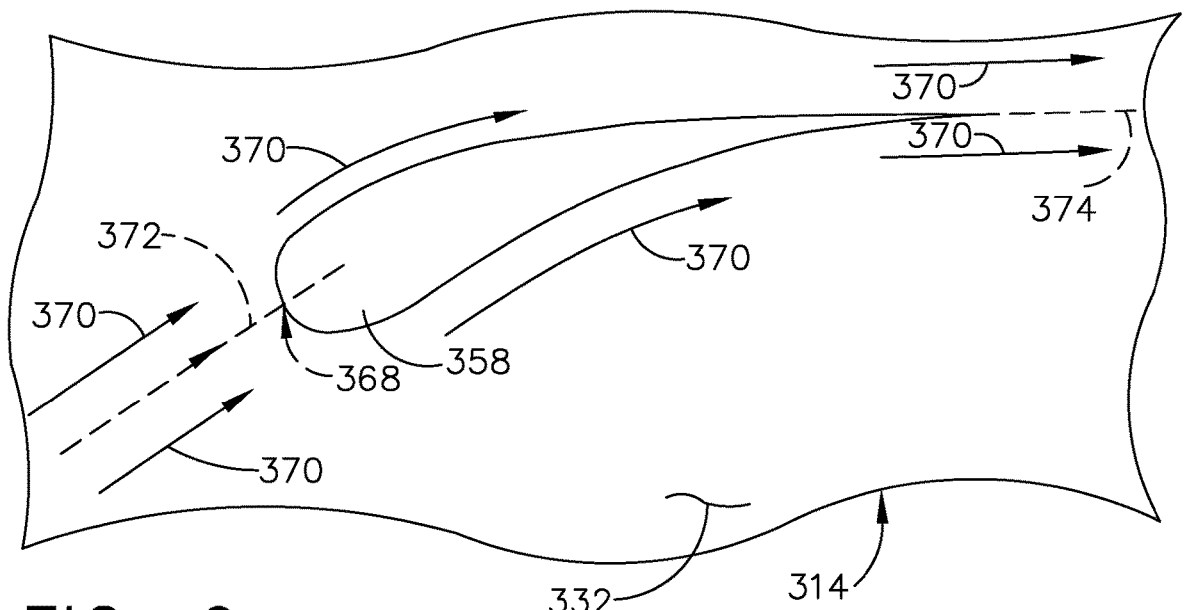
FIG. 9 is a top view of the stop of FIG. 8 illustrating airflow about the stop.

Referring now to FIG. 9, a local flow of fluid 370 can pass along the stop 358 over the core engine 314. The flow of fluid 370 can have a circumferential component, which can be generated by outlet guide vanes, such as the outlet guide vanes 48 of FIG. 1, for example. Such a circumferential component can combine with an axial component, generating a helical flow path around the core engine 314.

The shape and orientation of the stop 358 can be arranged to orient the leading edge axis 372 parallel to the local flow of fluid 370. The cambered geometry of the stop 358 can provide for at least partially turning the flow of fluid 370 adjacent the stop 358 about the stop centerline 368 to be an axial flow, minimizing or eliminating the circumferential component of the flow local to the stop 358. Such an organization can provide for minimizing drag or swirl caused by the stop 358 confronting the flow of fluid 370 having the circumferential flow component, as well as improving flow attachment at and downstream of the stop 358. Reduction of the drag and swirl, and improvement of the flow attachment can provide for improved specific fuel consumption, while providing for the benefits of the thrust reverser assembly sharing the aerodynamic load with the stop 358.

Figure 10:
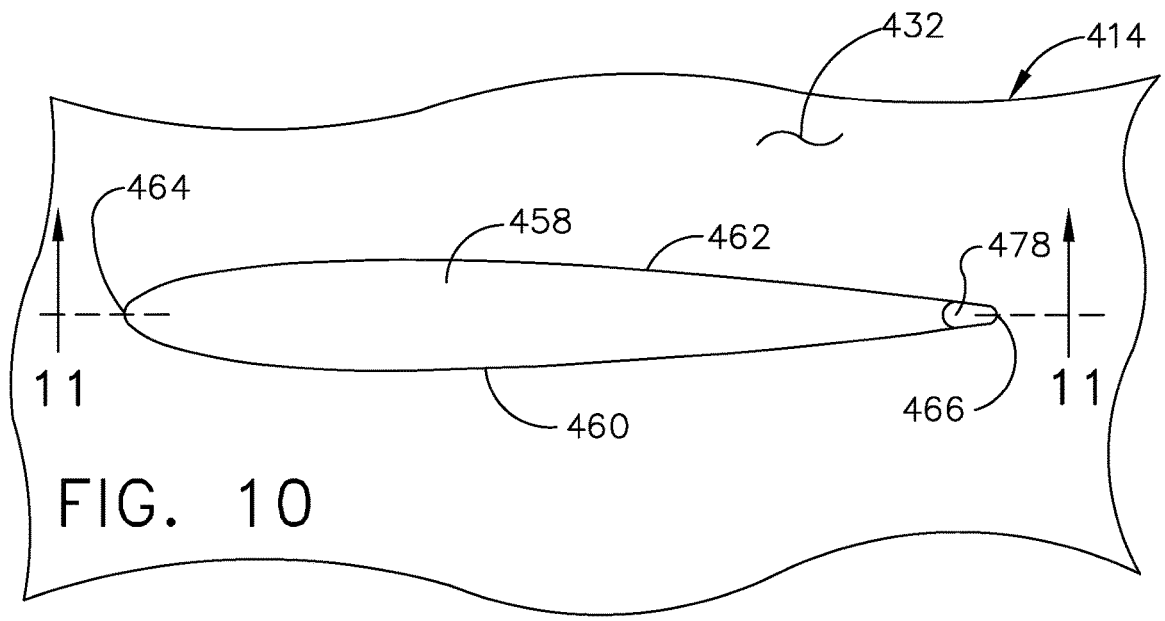
FIG. 10 is a top view of a stop having an airfoil shape and including an aperture arranged at a trailing edge of the stop.

Referring now to FIG. 10, a stop 458 can include an airfoil shape, having a first sidewall 460, a second sidewall 462, and extending between a leading edge 464 and a trailing edge 466. The stop 458 can be positioned along an inner cowl 432 of a core engine 414, for example, such as along the inner core cowl 32 of the core engine 14 of FIG. 1. While illustrated as a symmetric, airfoil-shaped stop 458, it is contemplated that the stop 458 can include a cambered-airfoil shape, or any other suitable shape. An aperture 278 can be provided in the stop 458, and can be provided at the trailing edge 466 of the airfoil-shaped stop 458.

Figure 11:
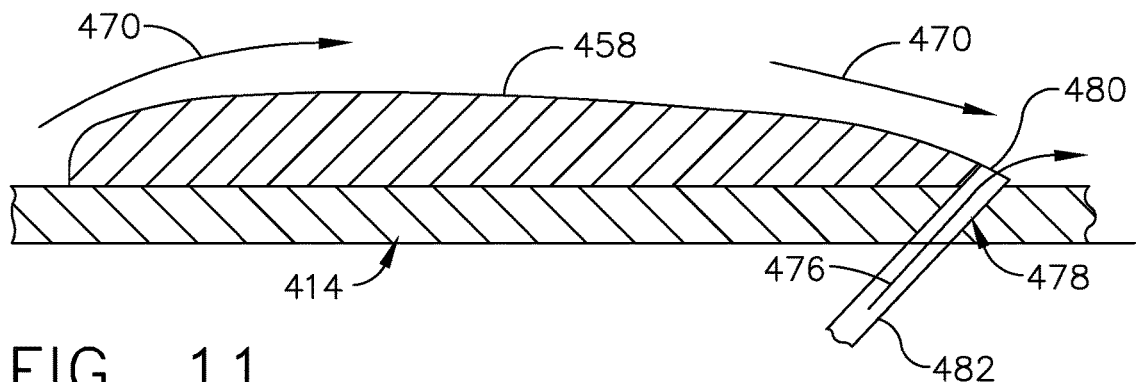
FIG. 11 is a cross-sectional view of the airfoil of FIG. 10 taken across section 11-11 illustrating a flow path through the aperture.

Referring now to FIG. 11, a cross-sectional view of the stop 458 taken across section 11-11 of FIG. 10 illustrates the aperture 478 extending through the stop 458 and into the core engine 414. An outlet 480 for the aperture 478 can be provided on the stop 458. A conduit 482 can couple to the aperture 478. The conduit 482 can fluidly couple the aperture 478 to a supply of fluid 470, which can exhaust from the stop 458 at the trailing edge 466 from the aperture 478. In one non-limiting example, the aperture 478 can be supplied with the supply of fluid 476 from a bleed air source, such as taken from within the core engine 414. In one example, the bleed air source can come from the compressor section.

The supply of fluid 476 exhausts from the aperture 478 to improve boundary layer attachment downstream of the stop 458, integrating with a mainstream flow of fluid 470. Improved boundary layer attachment can provide for reduced swirl downstream of the stop 458, which can improve specific fuel consumption of the engine while a blocker door has not been deployed to the stop 458.

Figure 12:
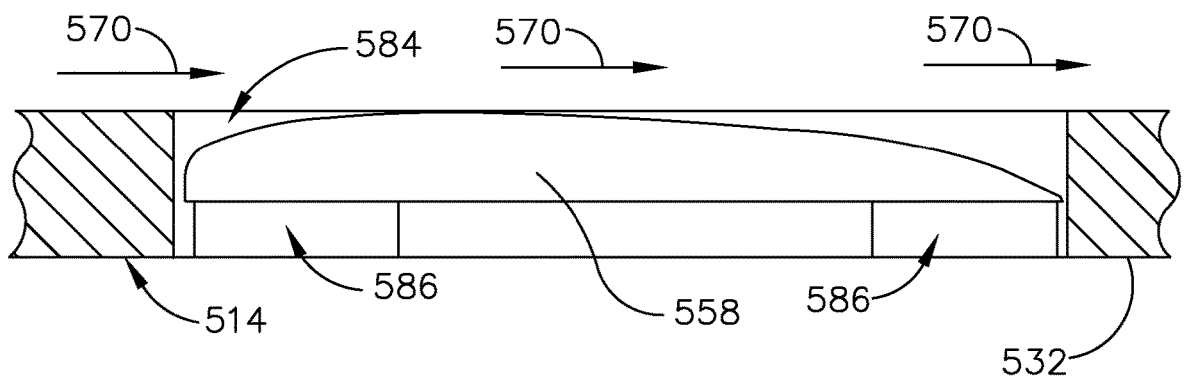
FIG. 12 is a cross-sectional view of a cavity in a core engine having a stop coupled to a stop actuator and provided within the cavity.

Referring now to FIG. 12, a cavity 584 can be formed in an inner core cowl 532 of a core engine 514. A stop 558, having an airfoil shape, can be provided within the cavity 584, while a stop having any shape can be utilized. A stop actuator 586 can couple to the stop 558. The stop actuator 586 can include a single actuator, or can be multiple actuators, and is shown as a two-part actuator assembly. As shown in FIG. 12, the stop 558 is provided within the cavity 584 in an unextended position. A flow of fluid 570 can pass over the cavity 584 along the core engine 514, in a substantially laminar manner. It is contemplated that a cover can enclose the cavity 584 while the stop 558 is in the unextended position.

Figure 13:
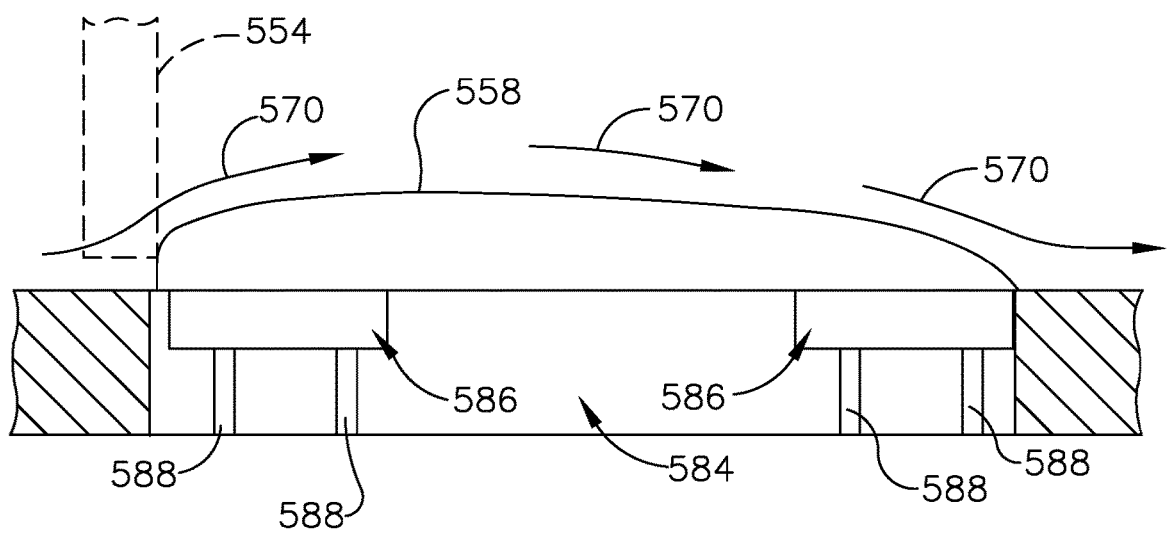
FIG. 13 is a cross-sectional view of the core engine of FIG. 12 having the stop deployed from the cavity by the stop actuator.

Referring now to FIG. 13, the stop actuator 586 has been actuated with four extenders 588 extending the stop 558 into the flow of fluid 570 to define an extended position. While extenders 588 are shown, any suitable method or mechanism to position the stop 558 outside of the cavity 584 is contemplated. In the extended position, the stop 558 can be adapted to abut a deployed blocker door 554. The stop 558 provided in the cavity 584 while the blocker door 554 is not in the deployed position minimizes or eliminates drag or swirl generated in the flow of fluid 570, which can reduce specific fuel consumption. In one example, the stop actuator 586 can be communicatively or operably coupled with the blocker door 554 to deploy and extend simultaneously, so the stop 558 is only extended when the blocker door 554 is deployed.

While the stops of FIGS. 6-13 are illustrated as having an airfoil shape, alternative aerodynamic shapes are contemplated that may reduce drag or swirl generated by the stops to improve specific fuel consumption. Non-limiting examples of stops can include shapes such as oval, rounded, circular, elliptical, curved, arcuate, or a combination of the aforementioned with a linear or rectilinear portion, such as a truncated edge or portion.

It should be appreciated that the operation of the blocker doors and their guided and rotating connections are not dependent on any particular type of cascade design, and in fact, the invention could be installed in a non-cascade reverser design which the bypassed air is diverted from the bypass duct through openings of various configurations. Furthermore, whereas the blocker door is shown with a rigid construction that does not intentionally bend, flex or fold during its deployment, blocker doors having any of these capabilities are also within the scope of the invention. It should be further understood that an extended length blocker door or folding door that extends as it is deployed can be utilized to provide a blocker door that, when deployed, is capable of extending into the external airflow to provide additional retarding drag. Finally, it should also be appreciated that the thrust reverser assembly and its individual components can be constructed of various materials, including metallic, plastic and composite materials commonly used in aerospace applications and fabricated by machining, casting, molding, lamination, etc., and combinations thereof.

In any of the above various aspects, a protective coating, such as a thermal barrier coating, or multi-layer protective coating system can be applied to the cowls or engine components. The various aspects of systems, methods, and other devices related to the invention disclosed herein provide an improved thrust reverser assembly, particularly in a fan cowl. Conventional thrust reverser assemblies utilize a blocker door coupled to an actuation system. However, the actuation system must have enough structural integrity to support the load created by the force of the airflow against the blocker door as it opens within the bypass duct, requiring a larger actuation system. By utilizing a stop on the inner core cowl or on the blocker door, the load is transferred to the stop or the core engine. As such, a smaller load is borne by the actuation system, allowing a lighter, smaller actuation system, decreasing the weight of the system and creating additional room within the nacelle structure.

It should be appreciated that the stops as described herein can provide for reduced drag or swirl caused by the stops when the blocker door is in a stowed position. Reduction of drag, swirl, or any other similar aerodynamic irregularity can provide for improved specific fuel consumption while the blocker door is in the stowed position, while providing for the aerodynamic loading while the blocker door is in the deployed position.

To the extent not already described, the different features and structures of the various embodiments can be used in combination, or in substitution with each other as desired. For example, one or more of the features shown in FIGS. 8-13 can be combined in any suitable manner, such as including two or three of the features. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   a core engine defining an engine centerline;
   a nacelle surrounding at least a portion of the core engine and including a nacelle interior;
   a bypass duct defined by and between the nacelle and the core engine;
   a blocker door coupled to the nacelle and movable between a stowed position, where the blocker door is positioned in the nacelle interior, and a deployed position, where the blocker door extends into the bypass duct to deflect air from the bypass duct;
a blocker door actuator mechanically coupled to the blocker door selectively moving the blocker door between the stowed and deployed positions; and
a stop having an airfoil shape including a leading edge and a trailing edge, and located on the core engine where the blocker door abuts the stop in the deployed position, and further comprising three of:
a curved stop centerline extending between the leading edge and the trailing edge to define a cambered airfoil shape;
an aperture extending through the stop;
a stop actuator operable to extend the stop into the bypass duct when the blocker door is in the deployed position.

2. A turbine engine comprising:
a core engine defining an engine centerline;
a nacelle surrounding at least a portion of the core engine and including a nacelle interior;
a bypass duct defined by and between the nacelle and the core engine;
a blocker door coupled to the nacelle and movable between a stowed position, where the blocker door is positioned in the nacelle interior, and a deployed position, where the blocker door extends into the bypass duct to deflect air from the bypass duct;
a blocker door actuator mechanically coupled to the blocker door selectively moving the blocker door between the stowed and deployed positions; and
a stop having an airfoil shape including a leading edge and a trailing edge, and located on the core engine where the blocker door abuts the stop in the deployed position, and further comprising at least one of:
a curved stop centerline extending between the leading edge and the trailing edge to define a cambered airfoil shape;
an aperture extending through the stop;
a stop actuator operable to extend the stop into the bypass duct when the blocker door is in the deployed position;
wherein the stop comprises the curved stop centerline extending between the leading edge and the trailing edge to define the cambered airfoil shape;
wherein the curved stop centerline at the leading edge of the stop is aligned parallel with a local flow of fluid through the bypass duct.

3. The turbine engine of claim 2 wherein the curved stop centerline at the trailing edge of the stop is aligned parallel to the engine centerline.

4. A turbine engine comprising:
a core engine defining an engine centerline;
a nacelle surrounding at least a portion of the core engine and including a nacelle interior;
a bypass duct defined by and between the nacelle and the core engine;
a blocker door coupled to the nacelle and movable between a stowed position, where the blocker door is positioned in the nacelle interior, and a deployed position, where the blocker door extends into the bypass duct to deflect air from the bypass duct;
a blocker door actuator mechanically coupled to the blocker door selectively moving the blocker door between the stowed and deployed positions; and
a stop having an airfoil shape including a leading edge and a trailing edge, and located on the core engine where the blocker door abuts the stop in the deployed position, and further comprising at least one of:
a curved stop centerline extending between the leading edge and the trailing edge to define a cambered airfoil shape;
an aperture extending through the stop;
a stop actuator operable to extend the stop into the bypass duct when the blocker door is in the deployed position;
wherein the stop further comprises the stop actuator operable to extend the stop into the bypass duct when the blocker door is in the deployed position.

5. The turbine engine of claim 4 wherein the stop further comprises two of:
the curved stop centerline extending between the leading edge and the trailing edge to define the cambered airfoil shape;
the aperture extending through the stop; or
the stop actuator operable to extend the stop into the bypass duct when the blocker door is in the deployed position.

6. The turbine engine of claim 4 wherein the stop comprises the curved stop centerline extending between the leading edge and the trailing edge to define the cambered airfoil shape.

7. The turbine engine of claim 6 further comprising at least one outlet guide vane provided in the bypass duct to direct a local flow of fluid at least partially in a circumferential direction relative to the core engine.

8. The turbine engine of claim 7 wherein the curved stop centerline at the leading edge of the stop is aligned relative to the circumferential direction of the local flow of fluid.

9. The turbine engine of claim 4 wherein the stop comprises the aperture extending through the stop.

10. The turbine engine of claim 9 wherein the aperture is provided at the trailing edge of the stop.

11. The turbine engine of claim 10 further comprising a bleed air conduit at least partially extending through the core engine and wherein the aperture is fluidly coupled with the bleed air conduit to supply a flow of bleed air to the aperture.

12. The turbine engine of claim 4 wherein the core engine further includes a cavity and the stop is positioned in the cavity.

13. The turbine engine of claim 12 wherein the stop actuator extends the stop exterior of the cavity and into the bypass duct when the blocker door is in the deployed position.

14. The turbine engine of claim 4 further comprising an inner cowl forming an exterior of the core engine, with the stop located on the inner cowl of the core engine.

15. A thrust reverser assembly for a turbine engine including a core engine and a nacelle surrounding at least a portion of the core engine to define a bypass duct between the nacelle and the core engine, including:
a cascade element;
a blocker door movable between a stowed position, where the blocker door closes the cascade element, and a deployed position, where the blocker door opens the cascade element;
a blocker door actuator mechanically coupled to the blocker door selectively moving the blocker door between the stowed and deployed positions; and
a stop positioned to abut the blocker door in the deployed position to share aerodynamic loading on the blocker door in the deployed position; and further comprising three of:
an airfoil shape including a curved stop centerline extending between a leading edge and a trailing edge to define a cambered airfoil shape;
an aperture extending through the stop;

a stop actuator operable to extend the stop to abut the blocker door when the blocker door is in the deployed position.

16. The thrust reverser assembly of claim 15 wherein the stop comprises the curved stop centerline and the curved stop centerline at the leading edge of the stop is aligned with a local flow of fluid through the bypass duct.

17. A stop for a deployable hidden blocker door for a turbine engine comprising an airfoil shape defining a stop centerline extending between a leading edge and a trailing edge and positioned to abut the hidden blocker door in a deployed position to share aerodynamic loading on the deployed hidden blocker door;

wherein the stop further comprises three of:

a curved stop centerline extending between the leading edge and the trailing edge to define a cambered airfoil shape;

an aperture extending through the stop;

a stop actuator operable to extend the stop to abut the hidden blocker door when the blocker door is in the deployed position.

\* \* \* \* \*